United States Patent [19]

Russell

[11] 3,862,682
[45] Jan. 28, 1975

[54] MEAT HANDLING EQUIPMENT
[75] Inventor: Herman F. Russell, Detroit, Mich.
[73] Assignee: Hobart Corporation, Troy, Ohio
[22] Filed: May 18, 1973
[21] Appl. No.: 361,787

Related U.S. Application Data
[60] Division of Ser. No. 177,302, Sept. 2, 1971, Pat. No. 3,781,936, which is a continuation-in-part of Ser. No. 877,229, Nov. 17, 1969, Pat. No. 3,606,628.

[52] U.S. Cl.............. 198/229, 15/3.17, 29/116 R, 29/121 A, 29/125, 198/211
[51] Int. Cl....................... B65g 45/00, A22c 17/08
[58] Field of Search ............. 15/3.17; 198/209, 229, 198/211, 127 R, 127 E; 29/116 R, 116 AD, 29/125, 121 A

[56] References Cited
UNITED STATES PATENTS
1,670,809    5/1928    Hormel................................. 15/3.17

Primary Examiner—Edward L. Roberts
Attorney, Agent, or Firm—Biebel, French & Bugg

[57] ABSTRACT

A meat cleaning machine incorporates a pair of laterally adjustable sections, each incorporating a wire-like rotating gripping roller, which engage and move cuts of meat therebetween. A brush is associated with each roller for cooperation therewith in effecting a cleaning of the moved meat. Each roller is defined by a series of simultaneously driven toothed rings mounted on and traveling about arcuate spaced shields or supports.

9 Claims, 3 Drawing Figures

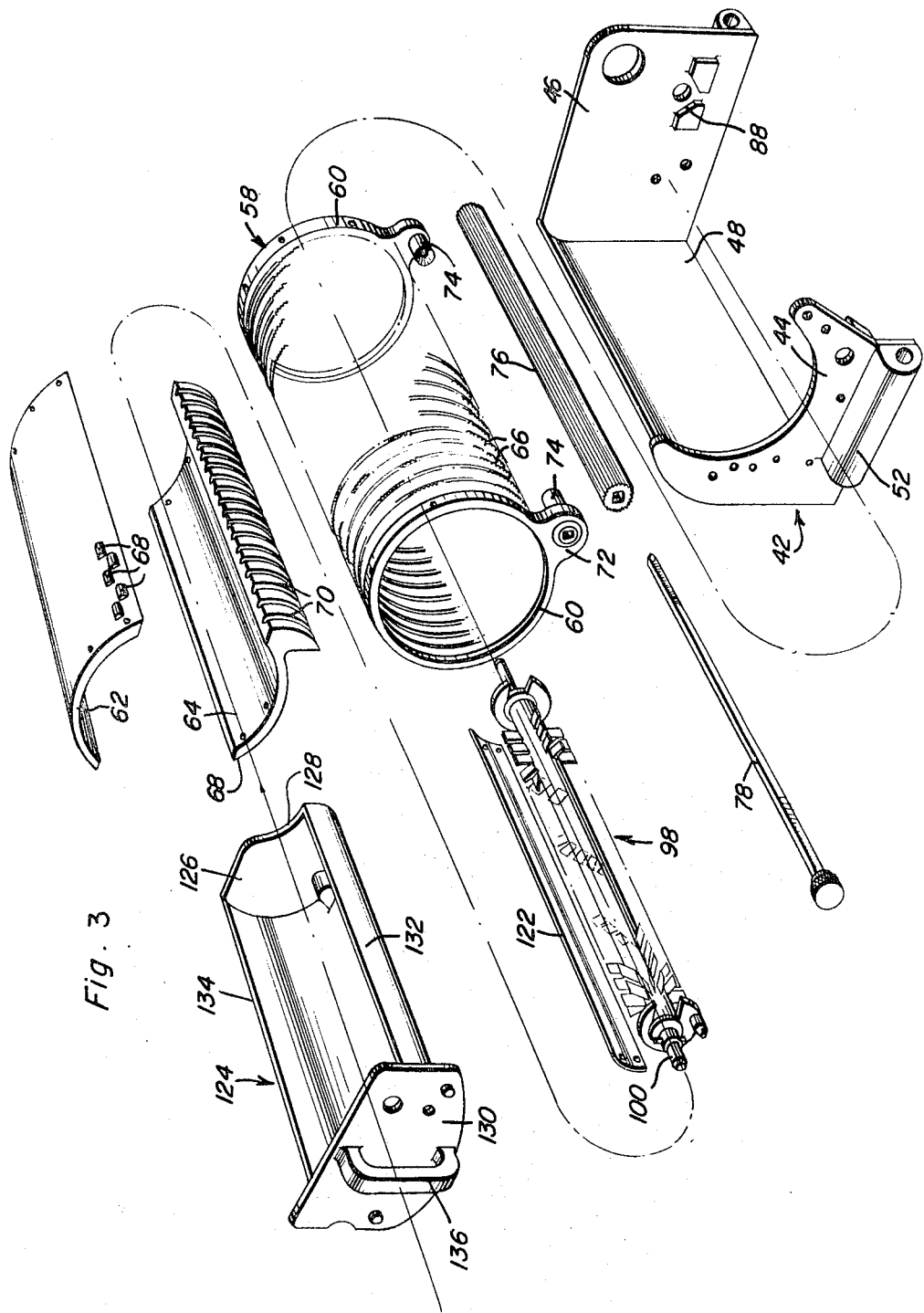

MEAT HANDLING EQUIPMENT

CROSS REFERENCE TO RELATED APPLICATIONS

This is a divisional application of U.S. application Ser. No. 177,302, filed Sept. 2, 1971, now U.S. Pat. No. 3,781,936, for "Meat Handling Equipment," which is in turn a continuation-in-part of Ser. No. 877,229, filed Nov. 17, 1969, now U.S. Pat. No. 3,606,628, issued Sept. 21, 1971.

BACKGROUND OF THE INVENTION

The instant invention is concerned with new and useful improvements in meat handling systems and equipment which contribute to the efficient and rapid handling of meat from the time immediately subsequent to the cutting of the meat through the wrapping stage.

SUMMARY OF THE INVENTION

The primary equipment included in the system comprises a meat cleaning machine which is basically similar to that disclosed in U.S. Pat. No. 3,606,628, particularly with regard to the mounting and overall operation thereof. However, significant structural differences are present which combine to increase the efficiency and operability of the machine in order more effectively to perform its primary function, that of receiving a cut of meat, automatically adjusting itself to the thickness of the cut, and automatically moving the meat through a cleaning operation which effectively cleans both sides thereof, removing bone dust, marrow, meat particles and the like prior to an automatic discharge of the meat. The equipment also includes an underlying circularly traveling receiving table, much in the nature of a "lazy susan," which receives the cleaned meat and moves it outward from the side located machine in a manner whereby an operator can easily remove the meat and transfer it to an adjacent trimming table at which point the final trimming is performed and the meat placed directly into an adjoining wrapping machine.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is an exploded perspective view of the major components of one of the sections.

DESCRIPTION OF THE PREFERRED EMBODIMENT

Figure 1:
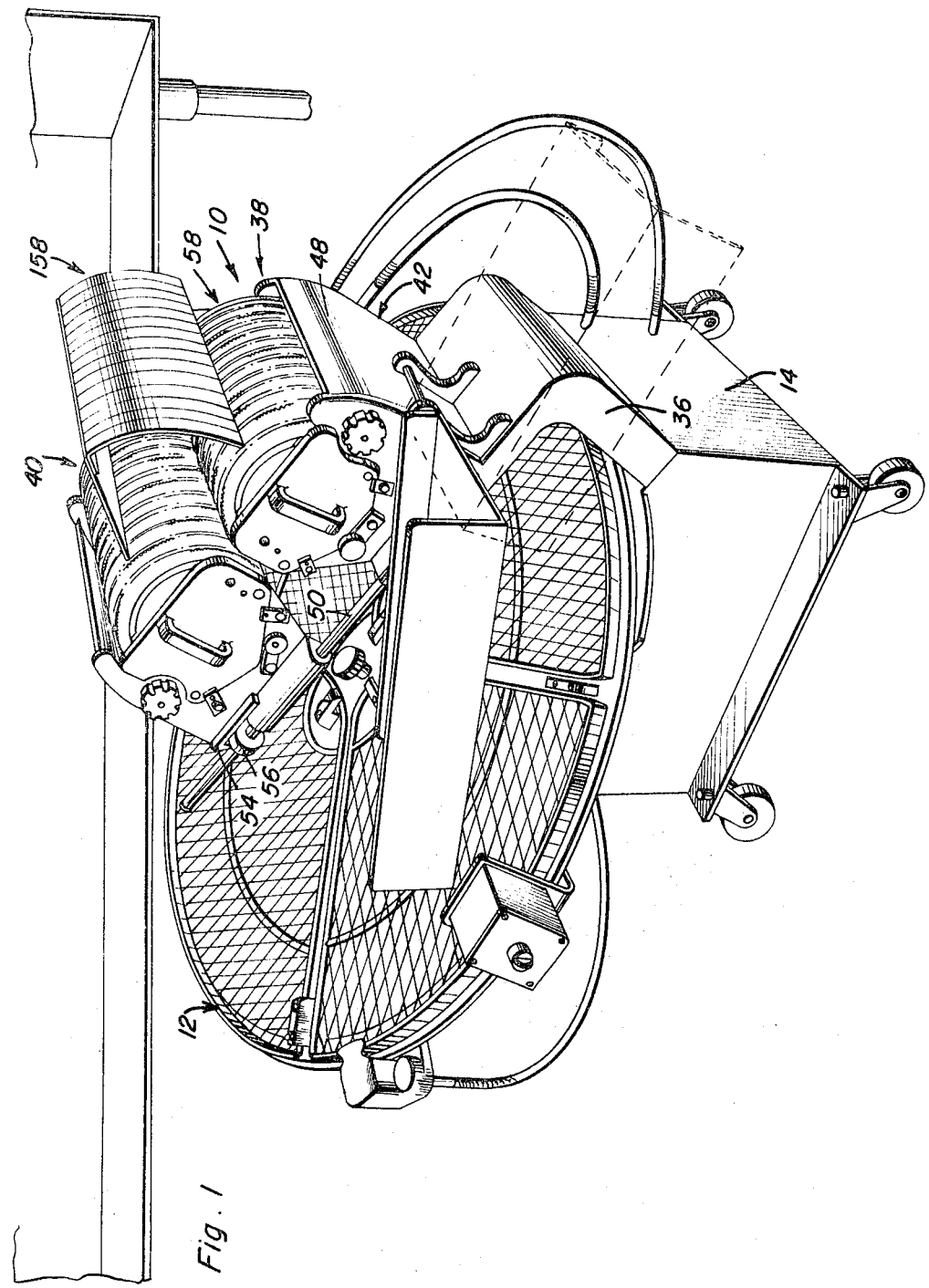
FIG. 1 is a perspective view of the meat cleaning machine and underlying rotatable meat transferring table.

Referring now more specifically to the drawings, the meat handling system of the invention includes a meat cleaning machine 10 operatively mounted over a rotating meat transferring table 12. An enlarged mobile base 14 mounts the table 12 and the meat cleaning machine 10 and contains the power source for the various operating components. The table 12 is oriented at an upward inclination with the cleaned meat discharging from the machine 10 falling on the lower portion thereof and being elevated to an upper point at which the meat is manually removed from the table for further handling.

In order to mount the meat cleaning machine to discharge the cleaned meat on the lower portion of the revolving table 12, an enlarged support arm 36 is provided, this arm 36 rising from the base 14 outward of the periphery of the table 12 and curving inwardly thereover to provide a stable mount for the machine 10.

As with the machine in U.S. Pat. No. 3,606,628, the machine 10 is formed at an inclination with similar lower and upper sections 38 and 40, both including a housing 42 which consists basically of opposed front and rear walls 44 and 46, and an elongated outer wall 48 extending therebetween. The lower section 38, and more particularly the housing 42 thereof, is affixed to the support or mount 36. The upper section 40 is mounted for sliding movement toward and away from the lower section 38 by means of front and rear elongated rods 50 affixed to the front and rear housing walls 44 and 46 of the lower section 38 and projecting upwardly therefrom. The corresponding front and rear walls 44 and 46 of the upper section 40 are in turn provided with elongated sleeves 52 which are slidably received over the rods 50 to enable the aforementioned sliding movement of the upper section 40 along the rods 50 toward and away from the lower section 38. It will of course be appreciated that the sliding movement is to enable an automatic accommodation of cuts of meat of different thicknesses. An appropriate retaining catch 54 and cooperating sleeve 56 can also be provided temporarily to hold the upper section 40 in an upwardly withdrawn position. The aforedescribed construction is similar to that set forth in U.S. Pat. No. 3,606,628, and as such, a further elaboration thereof is not considered necessary herein.

The actual gripping and movement of the meat through the cleaning machine 10 is effected by a pair of opposed wire-like cylinders or cylindrical rollers 58, one mounted within each of the sections 38 and 40. Each roller 58 includes a pair of rigid annular end rings 60 interconnected by elongated arcuate upper and lower positioning and supporting shields 62 and 64, the opposite ends of which are received within the opposed mounting rings 60 and affixed thereto by appropriate bolt means or the like. The positioning shields 62 and 64 mount a series of annular blades or gripping rings 66 at equally spaced points therealong between the two mounting rings 60. Each of the grippings rings 66 is provided with a uniformly serrated or toothed outer edge which functions to insure a proper, positive, yet non-compacting gripping of the meat. In addition, the toothed edges of the rings are utilized in the simultaneous driving of the rings of each roller 58.

In order properly to orient and slidably maintain each of the gripping rings 66 about the two positioning shields 62 and 64, the upper shield 62 is provided, along both longitudinal edges thereof, with a series of alternately offset spaced positioning lugs 68, the spacing between each pair of lugs being sufficient to maintain one of the rings 66 for sliding movement in response to a rotational driving thereof. The specific height and configuration of the lugs 68 will be chosen to maintain the rings vertical and preclude any longitudinal shifting or disorientation thereof. The lower positioning shield 64 includes similar stabilizing lugs 68 along the rear edge thereof, that is the edge outward of the portion of the roller which is to combine with the second roller in defining the meat path through the cleaning machine 10. The inner longitudinal edge of the lower shield 64 is provided with a plurality of enlarged arcuate lugs 70 of a height so as to project substantially beyond the gripping rings 66. These lugs 70 also act to guide and closely retain the rings. In addition, the lugs 70, due to the substantial height thereof, and the arcuate forward face through which the rings move when driven, effectively clean the rings, removing any scraps which might tend to cling thereto. In this manner, clean unencumbered gripping teeth will be insured.

Each of the end mounting rings 60 is provided with an integral radially outwardly projecting enlargement or ear 72 which rotatably mounts a laterally directed inwardly projecting bearing sleeve 74, the sleeves 74 of each pair of mounting rings 60 being aligned and mounting a tubular ribbed drive shaft 76. The ribs of the shaft 76 are so sized, and the shaft 76 so oriented, as to mesh with the teeth of the gripping rings 66 whereby a synchronized driving of the rings 66 of the roller 58 will be effected upon a rotational driving of the shaft 76.

The two bearing sleeves 74 which mount the shaft 76 have square internal passages therethrough for the reception of an elongated square drive pin 78. The pin 78 is inserted through an enlarged opening in the front wall 44 and extends through the aligned bearing sleeves 74 and intermediate supported shaft 76 with the inserted end of the pin 78 engaging within an appropriate rear wall mounted drive unit. In order properly to seat the roller or cylinder 58, the integral ears 72 of the mounting rings 60 are seated within inwardly directed seats 88 provided on the inner face of each of the walls 44 and 46.

Figure 2:
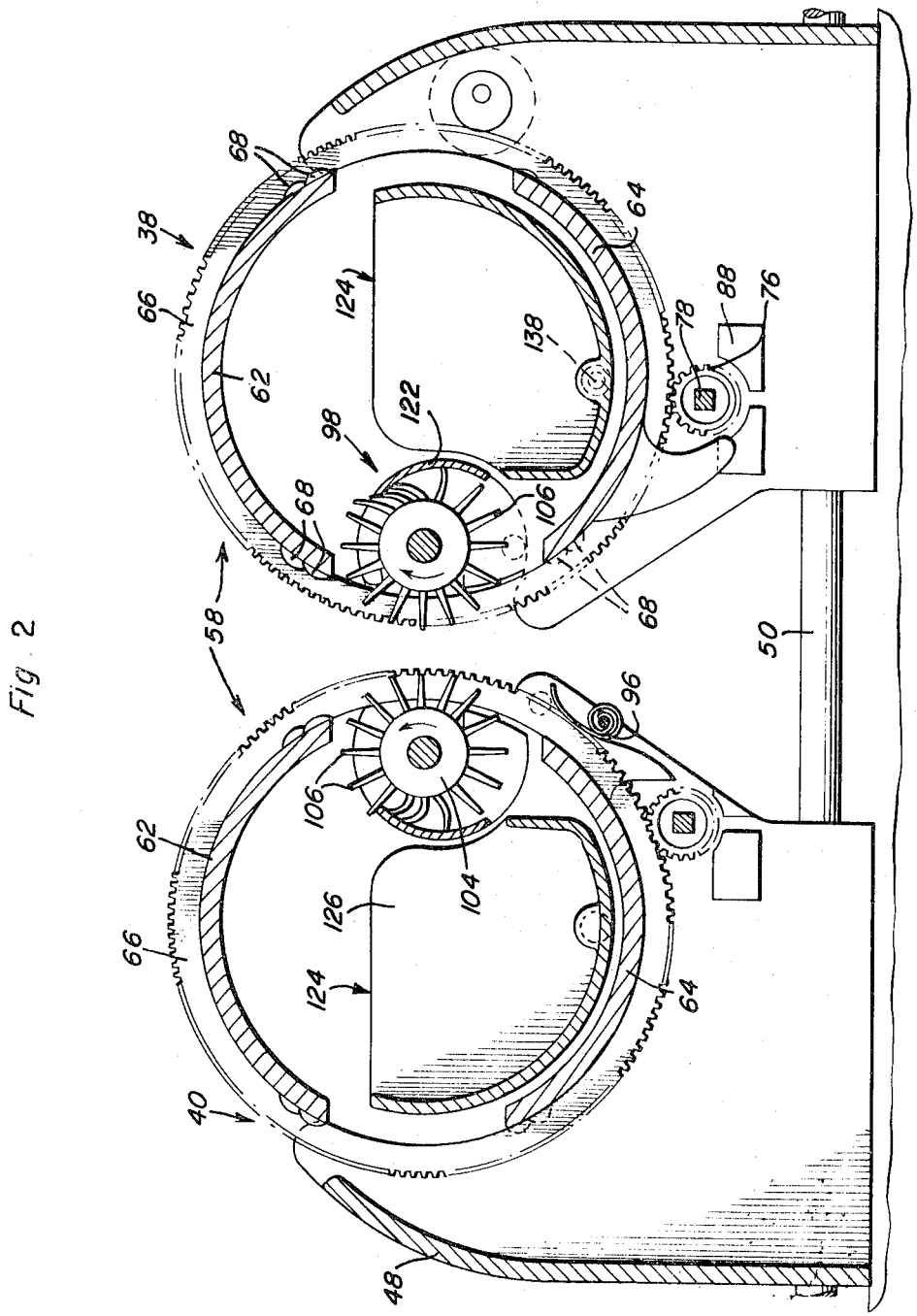
FIG. 2 is an enlarged cross-sectional view through the meat cleaning machine.

With reference to FIG. 2, slight differences will be noted in the construction of the various equivalent components of the lower and upper sections 38 and 40. Such differences arise from the inclination of the cleaning machine 10. For example, a pair of leaf retaining springs 96 are utilized in the upper section 40 resiliently to retain the associated upper gripping roller 58. These springs 96 bear against the corresponding mounting rings 60 and positively retain the cylinder 58. In addition, the ring cleaning lugs 70, which also function to guide the dropping meat and protect the drive shaft 76, vary in the overall shape thereof between the upper and lower cylinders 58 in that the lugs 70 on the lower cylinder 58 are relatively longer and provide a greater guide surface forward of the associated drive shaft 76 past which the meat will fall subsequent to the cleaning thereof effected between the cylinders 58.

The actual cleaning of the cut of meat as it is moved vertically downwardly between the sections 38 and 40 by the parallel gripping rollers 58 is effected by a pair of elongated brushes or brush units 98, one mounted to extend longitudinally through each cylinder 58 adjacent the inner periphery thereof to engage, through the moving and gripping rings 66, the downwardly moving cut of meat. The ring cylinders rotate inwardly and downwardly to grip and move a cut of meat downwardly at a predetermined rate. At the same time, the brushes rotate upwardly and outwardly to engage the opposed sides of the cut of meat and effect an upward brushing and scraping of the surface particles therefrom. Each brush 98 includes an elongated central shaft 100 which, along a major portion of the length thereof sufficient to correspond substantially to the length of the cylinder 58, mounts a series of brushing or scraping members, each of which includes a central hub 104 and a plurality of circumferentially spaced radiating generally flat flexible fins 106. The brushing members are frictionally retained on the shaft 100, each being slightly rotatably offset from the adjacent member to define a spiraling pattern of fins or blades 106 along the length of the shaft 100. This spiraling arrangement will effect a progressive engagement with the meat and thereby provide for a balanced operation of the brush 98.

The hubs 104 are slightly thicker than the associated fins 106, providing a slight spacing between fins of adjacent members. These spacings are oriented to correspond to the gripping rings 66 to allow for a smooth movement of the rings and fins by and relative to each other as they move in opposite directions.

The rear end of the shaft 100 interlocks with a drive shaft which projects forwardly from a drive unit into engagement with the brush shaft 100 and rearwardly for stabilized rotational reception within an inwardly projecting retaining socket on an appropriate drive train mounted on the rear wall 46. The brush or brush unit 98 is thus cantilevered through the corresponding cylinder or roller 58 from the driven rear thereof.

In order to maintain the fins 106 in a continuous clean condition, an elongated, relatively narrow, arcuate scraper 122 is provided along the brush unit 98 immediately to the rear of the rotating fins 106 and positioned to engage and cause a flexing of the fins and a corresponding scraping of the food particles therefrom.

An elongated scrap tray 124 is positioned longitudinally within each cylinder or cylindrical roller 58 slightly to the rear and below the associated brush unit 98. Each scrap tray 124 has a generally arcuate body extending between a rear wall 126, including a relieved portion 128 to accommodate the brush unit, and an enlarged flat front wall 130 which engages against and encloses the enlarged access recess provided in the front wall 44 of the corresponding housing 42. The arcuate body 124 includes a relatively low inside wall 132 and a relatively high outside wall 134. The tray 124, when positioned, noting FIG. 2 in particular, is so oriented whereby the scraps scraped by the corresponding brush unit 98 will, particularly upon engagement of the fins 106 with the scraper 122, be discharged into the scrap tray 124 over the low inside wall 132 thereof, the high outside wall 134 being in the nature of a catcher or backstop for the scraps.

The removal and emptying of the scrap tray 124 is simplified by the provision of an enlarged handle 136 on the front wall 130 thereof. Further, proper orientation of the scrap tray is insured through the use of one or more locating pins 138 thereon.

The introduction of the meat into the meat cleaning maching 10 is to be effected over the inwardly and downwardly rotating cylinder 58 of the lower section 38, the meat being placed on the upper surface thereof and carried therearound for engagement by the second cylinder. A combined shield and backstop 158 is provided at the upper intake portion of the machine.

From the foregoing, it will be appreciated that the system of the instant invention, unique in its overall concept, incorporates an improved and highly practical meat cleaning machine. In the cleaning machine, the meat is received and vertically guided by a pair of oppositely rotating cylinders formed, in each instance, of a series of independent gripping rings with toothed exteriors provided both for a firm yet non-compacting gripping of the meat and for driving engagement with a ribbed drive shaft. The rings travel over upper and lower shield which guide and retain the rings, the shields being so spaced as to allow for a proper orientation of the brush and an operative engagement of the brush with the moving meat. It will also of course be appreciated that the materials used throughout the machine, whether of plastic or metal, are appropriate for use in food handling equipment, enabling the provision of sterile food engaging components, easily cleaned and maintained. As a safety factor, noting FIGS. 1 and 2 in particular, the area immediately below the rollers is outwardly enlarged or open and the shielding unit is mounted solely on the rear of the machine. Thus, should an operator inadvertently catch his hand or arm in the machine, it will pass freely through with little or not injury.

The foregoing is considered as illustrated only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. For use in a meat cleaning machine, a meat gripping and moving cylinder comprising a plurality of gripping rings, each ring having a meat engaging outer edge and an inner edge of a common diameter, mounting members extending transversely of said rings and slidably supporting edges of the rings, at least one of said members having an arcuate surface coextensive with part of an edge of each ring to locate the rings on a common axis and to constrain the rings from shifting to an eccentric position, and means separating said rings in laterally spaced relation to each other.

2. The cylinder of claim 1 wherein said one mounting member includes spaced upstanding projections extending between said rings and guiding them into parallel relation.

3. The cylinder of claim 2 wherein said projections are oriented in a staggered relationship to each other along said member.

4. The cylinder of claim 1 further comprising rigid end members removably affixed to said mounting members at opposite ends thereof.

5. The cylinder of claim 1 wherein said mounting members extend internally of said rings and engage the inner edges of said rings for support and guidance thereof.

6. The cylinder of claim 1 further comprising lugs extending from within said cylinder and projecting through the spaces between said rings to remove meat particles from said rings.

7. For use in a meat cleaning machine, a meat gripping and moving cylinder and mount therefor, comprising:
 a. a plurality of blade-like rings having an outer serrated meat gripping edge and a circular inner edge,
 b. a carrier framework extending the length of the cylinder,
 c. first and second ring supports forming a part of said framework and internally supporting said rings,
 d. at least one of said ring supports having an arcuate surface coextensive with a part of the inner edge of each of said rings holding said rings concentrically in position on said framework,
 e. said rings being rotatable with respect to said framework, and
 f. at least one of said supports being removable from said framework to allow disassembly of said rings from said cylinder.

8. The device of claim 7 wherein both said ring supports have said arcuate surfaces to contain and guide the positions of the rings about a common axis.

9. The device of claim 7 including spacers on said arcuate surfaces maintaining said rings in spaced apart relation.

* * * * *